Patented May 18, 1954

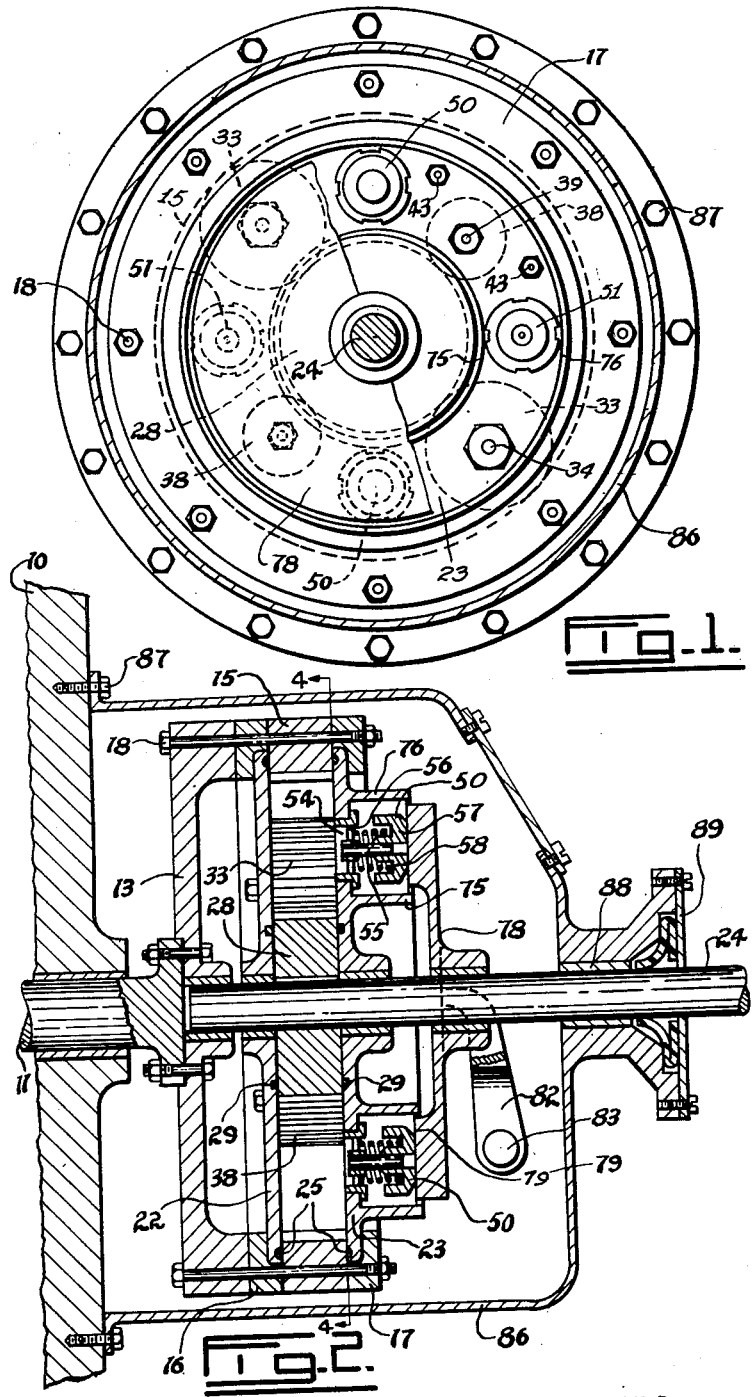

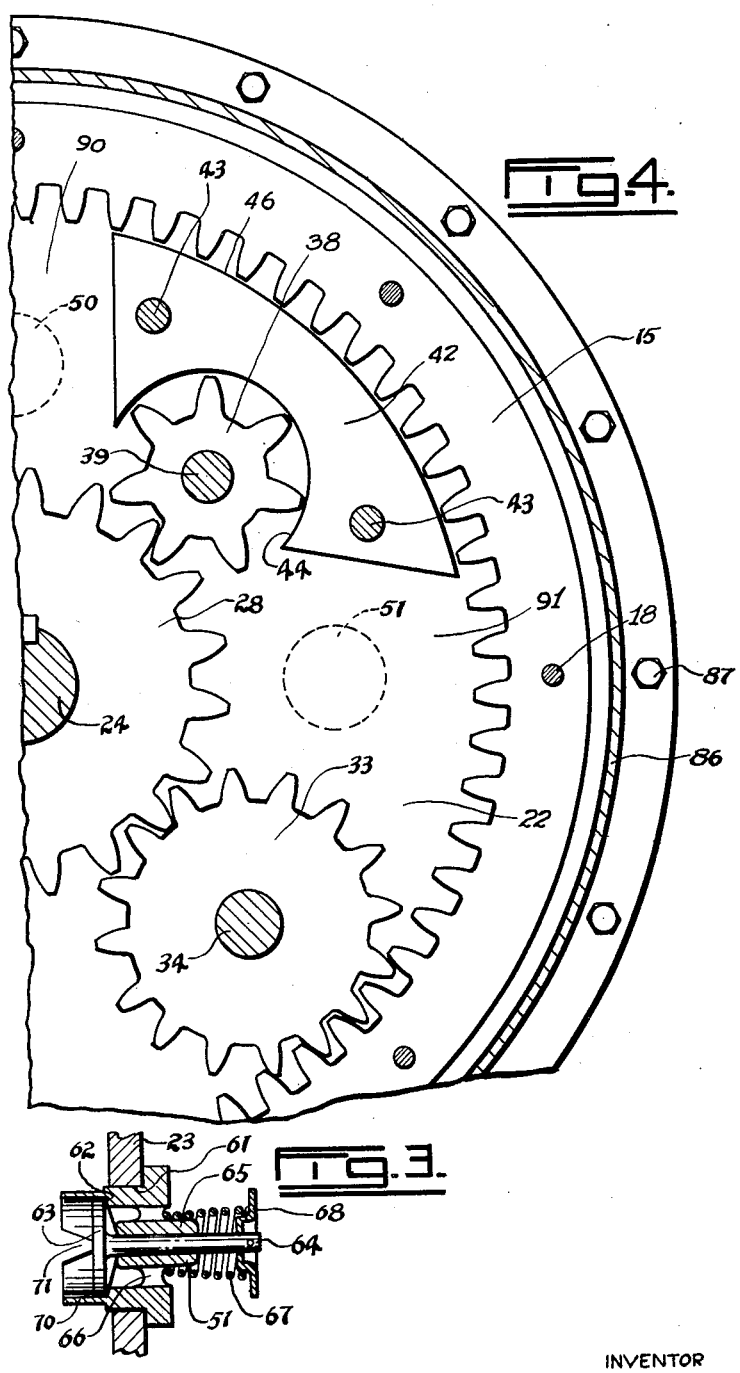

2,678,710

UNITED STATES PATENT OFFICE 2,678,710

GEAR PUMP TYPE FLUID CLUTCH

Alfred Baptiste Sterne, Vancouver, British Columbia, Canada

Application December 20, 1947, Serial No. 792,890

2 Claims. (Cl. 192—61)

This invention relates to improvements in power transmission apparatus, such as a fluid drive clutch.

This invention is particularly applicable to motor vehicles in which power must be transferred from the engines thereof to the drive wheels. The main purpose of the invention is to be able to transfer this power under different load conditions and speeds without the necessity of a clutch and gear shifting mechanism.

Another object is the provision of a device by means of which power may gradually and smoothly be applied from a prime mover to apparatus to be moved.

Another object is the provision of a fluid drive clutch which is not under load during the operation of the engine when the power thereof is not being transmitted to the driven elements.

An example of this invention is illustrated in the accompanying drawings, in which, Figure 1 is an end elevation of the device with part of the casing thereof broken away, Figure 2 is a longitudinal section through the device, Figure 3 is an enlarged detail of a discharge valve, and Figure 4 is an enlarged fragmentary section taken substantially on the line 4—4 of Figure 2.

Referring to the drawings, 10 represents an end of a prime mover, such as an internal combustion engine, having a drive shaft 11 projecting outwardly therefrom. A flywheel 13 is connected to the drive shaft and rotates therewith. An internal gear ring 15 is located between keeper rings 16 and 17. The keeper rings are connected to the gear ring and this assembly is secured to the flywheel by means of a plurality of bolts 18. Spaced circular plates 22 and 23 are rotatably mounted on a driven shaft 24. These plates extend outwardly from the shaft and overlap and bear against the gear ring 15. These plates may be provided with sealing rings 25 in the surfaces thereof bearing against the gear ring.

A centre gear 28 is fixed to the shaft 24 between the circular plates, and sealing rings 29 may be provided in the inner surfaces of the plates which bear against the sides of the gear. One or more sealing gears 33 slidably fit between the plates 22 and 23 and are rotatable on shafts 34 carried by said plates. The teeth of these gears mesh with the teeth of the ring gear 15 and the centre gear 28, see Figure 4. In this example, there are two sealing gears located diametrically opposite each other, as shown in dotted lines in Figure 1.

One or more pumping units, one for each sealing gear, are provided between the plates 22 and 23. In this example, the pumping unit consists of a pump gear 38 slidably fitting between the side plates and rotatably mounted on a shaft 39 carried by said plates. This gear is smaller than the gear 33 and it meshes with the centre gear 28. A pump wall block 42 is fixedly mounted between the side plates by bolts 43. This block is provided with a circular recess 44 which partially surrounds the pump gear 38. The centre of the curve of this recess coincides with the centre of the gear, and the tips of the teeth of the latter are very close to or slidably engage the surface of said recess. This block is also provided with a curved outer surface 46 which fits within the teeth of the ring 15, the tips of said teeth either being very close to this surface or slidably engaging it. Inlet control valves 50 and outlet control valves 51 are located in the side plate 23. There is an inlet and an outlet valve for each pump gear 38, one located on each side thereof. The inlet valve is located ahead and the outlet valve behind the pump gear with reference to the direction of movement of the ring gear 15.

The inlet valve 50 includes a port 54 in the plate 23, a stem 55 carried by a spider 56. A cap 57 slidably mounted on the stem is normally urged away therefrom by a spring 58. When the cap 57 is moved towards the plate 23 it closes the port 54, and when the cap is released the spring 58 moves the cap away from the port. Each port 54 actually forms an inlet for one of the pump units.

The outlet valve 51 also includes a port 61 in the side plate 23 and a valve seat 62 is mounted in said port. A valve disc 63 normally rests on this seat and has a stem 64 slidably extending through a sleeve 65 held in place by a spider 66. A spring 67 lies between the spider and a bearing 68 connected to the outer end of the stem. This spring normally keeps the valve closed. A collar 70 extends inwardly from the valve seat 62 and has one or more V-shaped cutouts 71 in the wall thereof. The disc 63 is slidably mounted in this collar.

Spaced-apart and concentric rings 75 and 76 project outwardly from the plate 23 and form walls on each side of the inlet and outlet valves and the heads or nuts of any bolts extending through the side plates. A control disc 78 is slidably mounted on the shaft 24 and has an annular projection 79 on its inner surface at the periphery thereof which extends into the space between the rings 75 and 76 to bear against the caps 57 of the inlet valve and the bearings 68 of the outlet valve. A forked control lever 82 bears at one end against the disc 78 and is fixedly mounted at its opposite end on a shaft 83 which may be rotated by any suitable control mechanism, such as a pedal or lever, not shown.

The entire apparatus is enclosed within a housing 86 which may be mounted on the back of the prime mover 10 by studs 87. This housing is provided with a bearing 88 through which the shaft 24 extends, and any suitable type of oil seal 89 may be provided around the shaft adjacent the bearing.

The housing 86 is filled with a suitable fluid, such as oil.

In operation, when the prime mover or engine 10 is functioning, the power shaft 11 and flywheel 13 are rotated. The ring gear 15 moves with the flywheel. As the teeth of this ring gear mesh with each of the sealing gears 33 and the latter also mesh with the stationary centre gear 28, the sealing gears move around the centre gear, the speed of movement depending upon the number of teeth of the ring gear and the other gears. This movement of the sealing gears causes the side plates 22 and 23 to rotate around the shaft 24. When the control disc 78 is moved towards the plate 23, the inlet valves 50 are closed, while the outlet valves 51 are open. At this time, no appreciable amount of oil remains within the space between the side plates and the ring gear and, consequently, the shaft 24 is not rotated. When the control disc is moved away from the plate 23 sufficiently to permit the inlet and outlet valves fully to open and close, respectively, oil enters the space between the side plates through the port 54 into an area ahead of each pump gear 38 which might be termed a supply chamber 90, see Figure 4. The teeth of the ring gear and the teeth of the pump gear tend to move oil from said chamber past the pump wall block 42 into an area which may be termed a pressure chamber 91. Thus, the pump gear with port 54 form means for pumping oil from the housing 86 into the pressure chamber. As the sealing gear 33 prevents this oil from going any farther, it builds up in the pressure chamber until it becomes substantially the equivalent of a solid mass. At this time, the side plates and the centre gear rotate as a unit with the ring gear so that the shaft 24 rotates at the same speed as the drive or power shaft 11. If it is desired to have the shaft 24 rotate at a lower speed than the shaft 11, the disc 78 may be moved towards the side plate 23 partially to close the inlet valve and partially to open the outlet valve. This allows some of the oil to escape from the chamber 91 so that there will be some relative movement between the ring gear and the centre gear. The amount of slippage depends upon the degree of opening of the outlet valve. The V-shaped recesses 71 in the collar 70 make it possible gradually to restrict the flow of oil out of the outlet valve so that the device will operate smoothly at all times.

It will be noted by referring to Figure 1 that an inlet valve 50, pump gear 38, outlet valve 51 and sealing gear 33 form a complete set. In this example of the invention, there are two of these complete sets, but it is obvious that any practical number of these sets may be used.

While a pump gear has been illustrated and described, it is to be understood that any other type of pump may be used for the same purpose. Furthermore, the shaft 11 is the driving shaft and the shaft 24 is driven, but this may be reversed to make the shaft 24 the driving shaft and the shaft 11 the driven shaft.

What I claim as my invention is:

1. Power transmission apparatus comprising a driving shaft and a driven shaft, a centre gear fixedly mounted on one of said shafts, spaced side plates freely mounted on said shaft and bearing against the opposite sides of the gear, an internal gear ring slidably fitting between the plates and spaced from the centre gear, means connecting the gear ring to the other shaft for rotation therewith, spaced-apart sealing gears meshing with the centre and ring gears, a pump gear between and spaced from the sealing gears meshing only with the centre gear, the spaces between the pump gear and the sealing gears forming supply and pressure chambers, a block between the ring gear and the pump gear having a recess therein co-acting with said pump gear and through which said pump gear moves liquid from the supply chamber to the pressure chamber, said block having a surface co-acting with said ring gear teeth, said ring gear moving in the direction from the supply chamber to the pressure chamber to move liquid from said supply chamber to said pressure chamber in the spaces formed by the recesses in said ring gear teeth and said co-acting surface, an inlet extending laterally through one of the side plates communicating with the supply chamber, an outlet extending laterally through one of the plates connecting with the pressure chamber, valves for oppositely opening and closing the inlet and the outlet, and means for selectively and oppositely opening and closing the inlet and outlet valves.

2. Power transmission apparatus comprising a driving shaft and a driven shaft, a centre gear fixedly mounted on one of said shafts, spaced side plates freely mounted on said shaft and bearing against the opposite sides of the gear, an internal gear ring slidably fitting between the plates and spaced from the centre gear, means connecting the gear ring to the other shaft for rotating therewith, spaced-apart sealing gears meshing with the centre and ring gears, a pump gear between and spaced from the sealing gears meshing only with the centre gear, the spaces between the pump gear and the sealing gears forming supply and pressure chambers, a block between the ring gear and the pump gear having a recess therein co-acting with said pump gear and through which said pump gear moves liquid from the supply chamber to the pressure chamber, said block having a surface co-acting with said ring gear teeth, said ring gear moving in the direction from the supply chamber to the pressure chamber to move liquid from said supply chamber to said pressure chamber in the spaces formed by the recesses in said ring gear teeth and said co-acting surface, an inlet extending laterally through one of the side plates communicating with the supply chamber, an outlet extending laterally through one of the plates connecting with the pressure chamber, valves for gradually and oppositely opening and closing the inlet and outlet, a housing enclosing the side plates and associated elements, liquid filling said housing, and means within the housing and outside the plates for selectively and oppositely opening and closing the inlet and outlet valves.

References Cited in the file of this patent

UNITED STATES PATENTS

| Number | Name | Date |
|---|---|---|
| 541,483 | Hartness | June 25, 1895 |
| 1,307,488 | Durant | June 24, 1919 |
| 1,363,907 | Olson | Dec. 28, 1920 |
| 1,819,606 | Jones | Aug. 18, 1931 |
| 1,882,222 | Lewis | Oct. 11, 1932 |
| 2,209,949 | McCormick | Aug. 6, 1940 |
| 2,371,227 | Dodge | Mar. 13, 1945 |

FOREIGN PATENTS

| Number | Country | Date |
|---|---|---|
| 407,939 | Great Britain | Mar. 26, 1934 |